United States Patent
Kang (10) Patent No.: US 7,670,019 B2
(45) Date of Patent: Mar. 2, 2010

(54) BACKLIGHT ASSEMBLY, LIQUID CRYSTAL DISPLAY HAVING THE SAME AND METHOD THEREOF

(75) Inventor: Kyung Kang, Cheonan (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/763,723

(22) Filed: Jun. 15, 2007

(65) Prior Publication Data

US 2007/0291509 A1 Dec. 20, 2007

(30) Foreign Application Priority Data

Jun. 16, 2006 (KR) .................... 10-2006-0054358

(51) Int. Cl.
*G09F 13/04* (2006.01)
*G09F 13/08* (2006.01)

(52) U.S. Cl. .................. 362/97.1; 362/97.2; 362/225

(58) Field of Classification Search .................. 362/97, 362/221, 249, 225, 260, 611, 612, 614, 632, 362/634, 635; 349/61–71; 40/564–580, 40/545, 544
See application file for complete search history.

(56) References Cited

U.S. PATENT DOCUMENTS

| 5,485,145 | A  | * | 1/1996 | Sniff ....................... 340/815.4 |
| 6,568,831 | B2 | * | 5/2003 | Ono et al. .................... 362/221 |
| 6,796,678 | B2 | * | 9/2004 | Moon ......................... 362/225 |
| 7,167,219 | B2 | * | 1/2007 | Huang et al. .................. 349/60 |
| 2001/0017673 | A1 | * | 8/2001 | Lee ............................. 349/58 |
| 2003/0086255 | A1 | * | 5/2003 | Moon et al. .................... 362/97 |
| 2003/0227767 | A1 | * | 12/2003 | Lee et al. ...................... 362/23 |
| 2004/0001340 | A1 |   | 1/2004 | Shin |
| 2005/0243260 | A1 | * | 11/2005 | Kim ........................... 349/149 |
| 2005/0243548 | A1 | * | 11/2005 | Yamashita et al. .......... 362/225 |
| 2006/0002106 | A1 | * | 1/2006 | Hong et al. ................. 362/224 |

FOREIGN PATENT DOCUMENTS

| JP | 200143715 | 2/2001 |
| KR | 200624945 | 3/2006 |

OTHER PUBLICATIONS

European Search Report; EP07011308; Sep. 17, 2007. All references cited in the Search Report and not previously submitted are listed above.

Extended European Search Report; EP07011308; Oct. 8, 2007. All references cited in the extended Search Report and not previously submitted are listed above.

* cited by examiner

*Primary Examiner*—Sandra L O'Shea
*Assistant Examiner*—Danielle Allen
(74) *Attorney, Agent, or Firm*—Cantor Colburn LLP (57) ABSTRACT

A backlight assembly including a universal lamp unit with a common connecting structure coupling a lamp and an inverter through a lamp socket and a conductor when connecting the lamp and the inverter with each other, a liquid crystal display including the same and a method of manufacturing thereof. Backlight assembly includes a mold frame including a receiving space therein and a lamp unit disposed in the receiving space of the mold frame. The lamp unit includes at least one lamp, and at least one pair of lamp sockets disposed on the mold frame. The pair of lamp sockets secure the lamp and apply electric power to the lamp.

21 Claims, 5 Drawing Sheets

FIG. 1

(PRIOR ART)

BACKLIGHT ASSEMBLY, LIQUID CRYSTAL DISPLAY HAVING THE SAME AND METHOD THEREOF

This application claims priority to Korean Patent application No. 10-2006-0054358 filed on Jun. 16, 2006, and all the benefits accruing therefrom under 35 U.S.C. §119, the contents of which are herein incorporated by reference in its entirety.

BACKGROUND OF THE INVENTION

1. Field of the Invention

The present invention relates to a backlight assembly and a liquid crystal display having the same, and more particularly, to a backlight assembly including a lamp unit from which a wire is removed and using a lamp socket, and a liquid crystal display having the same.

2. Description of the Related Art

The application range of a liquid crystal display ("LCD") has been extended because of its good lightweight, thin, low-power drive, full color and high resolution characteristics. Such an LCD has been recently used in a computer, a notebook computer, personal digital assistant ("PDA"), a telephone, TV, an audio/video device, and the like. The LCD is used to adjust an amount of light transmitted in accordance with image signals applied to a number of control switches arrayed in a matrix form and then to display desired images on an LCD panel. Since such an LCD is not self-luminescent, a light source such as a backlight is required. A lamp has been widely used as such a light source. In such a case, a method of connecting a wire to an inverter through a soldering process has been used to supply the lamp with electric power.

Figure 1:
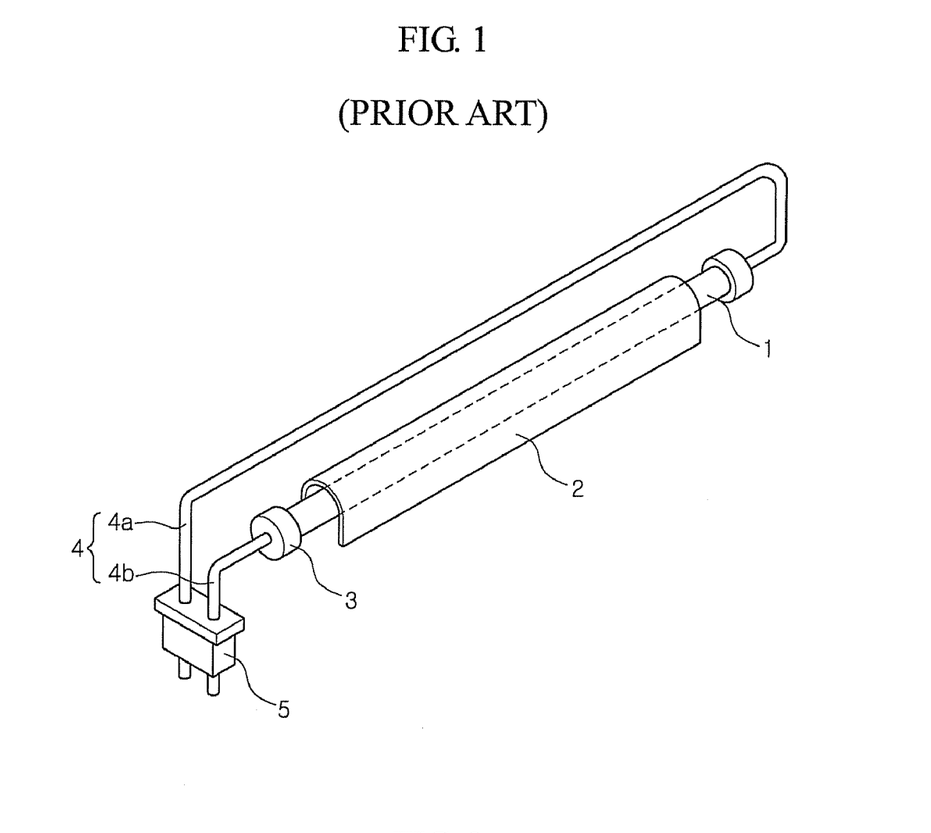
FIG. 1 is a view showing a schematic configuration of a lamp unit according to the prior art.

FIG. 1 is a view showing the schematic configuration of a lamp unit according to the prior art. Referring to FIG. 1, the lamp unit includes a lamp 1, a lamp reflector 2 for reflecting light emitted from the lamp, an inverter (not shown) for supplying the lamp with electric power, a lamp wire 4 composed of first and second lamp wires 4a and 4b for transferring electric power from the inverter to the lamp, a lamp connector 5 for connecting the lamp wire to the inverter and a lamp holder 3.

As described above, the related art lamp unit is configured in such a manner that the lamp is connected to the inverter by connecting the lamp connector 5 fixed to one end of the lamp wire 4 to an input connector (not shown) of the inverter.

However, since a variety of the input connectors of the inverters may be provided to meet the customer requirements, a variety of the lamp connectors should also be manufactured in correspondence with the various shapes and configurations of the input connectors of the inverters. Thus, even though the specifications of the liquid crystal display panel, the driving circuit and the backlight assembly are identical to one another, the LCD may be inevitably developed and produced as a different model due to difference in the structure of the lamp connector. Therefore, there are problems in that the development expense is increased, the production efficiency is lowered, and the production control is difficult.

Accordingly, there is a need to develop a universal connection structure for coupling a lamp and an inverter, which can be utilized in a variety of backlight assemblies regardless of the change of the lamp connector in a case where major parts of the backlight assembly are commonly used in multiple specifications.

BRIEF SUMMARY OF THE INVENTION

An exemplary embodiment provides a backlight assembly including a universal lamp unit with a common connecting structure for coupling a lamp and an inverter through a lamp socket and a conductor when connecting the lamp and the inverter with each other, and a liquid crystal display including the same.

In an exemplary embodiment there is provided a backlight assembly including a mold frame including a receiving space therein and a lamp unit disposed in the receiving space of the mold frame. The lamp unit includes at least one lamp and a lamp socket disposed on the mold frame. The lamp socket secures the lamp and applies electric power to the lamp.

In an exemplary embodiment, the lamp socket comprises at least one pair of lamp sockets.

In an exemplary embodiment, the lamp unit may further include an inverter supplying electric power to the lamp and a conductor electrically connecting the lamp socket and the inverter In an exemplary embodiment, the lamp unit may further include an inverter printed circuit board. The inverter is mounted on the inverter printed circuit board.

In an exemplary embodiment, the inverter or the inverter printed circuit board is disposed on the mold frame.

In an exemplary embodiment, the lamp unit may further include a first connector formed at one end of the conductor and a second connector formed at one end of the inverter printed circuit board. The second connector is connected electrically and mechanically to the first connector.

In an exemplary embodiment, the mold frame includes a plurality of sidewalls, and a seating portion protruding inward from the sidewalls.

In an exemplary embodiment, at least one pair of lamp sockets are disposed on the sidewall of the mold frame or on a top surface of the seating portion.

In an exemplary embodiment, the inverter or the inverter printed circuit board may be disposed on a top or bottom surface of the seating portion of the mold frame.

In an exemplary embodiment, the conductor may be disposed on a top or bottom surface of the seating portion of the mold frame.

In an exemplary embodiment, the lamp may include a lamp tube including discharge gas and fluorescent material layer and electrode portions installed at both ends of the lamp tube supplying electric power to the lamp.

In an exemplary embodiment, each of the pair of lamp sockets includes a body formed with a receiving portion on which the lamp is placed and a conductive fixing portion formed within the receiving portion and connected electrically to the electrode portion of the lamp.

In an exemplary embodiment, the lamp unit may further include a lamp reflector disposed at one side of the lamp and reflecting light emitted from the lamp.

In an exemplary embodiment, a backlight assembly may further include a light guide plate disposed at one side of the lamp unit and a plurality of optical sheets disposed on the light guide plate.

In an exemplary embodiment, the backlight assembly may further include a lower receiving container coupled with the mold frame.

In an exemplary embodiment, there is provided a liquid crystal display including a mold frame provided with a predetermined receiving space therein, a lamp unit including at least one lamp and at least one pair of lamp sockets disposed on the mold frame, and a liquid crystal display panel for displaying image thereon. The lamp sockets secure the lamp and apply electric power to the lamp An exemplary embodiment includes a method of manufacturing a backlight assembly, The method includes forming a mold frame including a receiving space and disposing a lamp unit in the receiving space. The lamp unit includes a lamp and a pair of lamp sockets securing the lamp and applying power to the lamp. The disposing a lamp unit includes disposing the lamp sockets on the mold frame.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" or "upper" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings.

Figure 2:
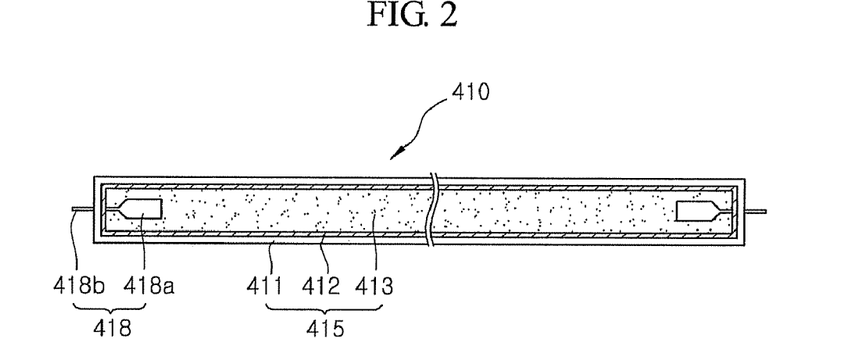
FIG. 2 is a schematic cross-sectional view of an exemplary embodiment of a lamp according to the present invention.
Figure 3A:
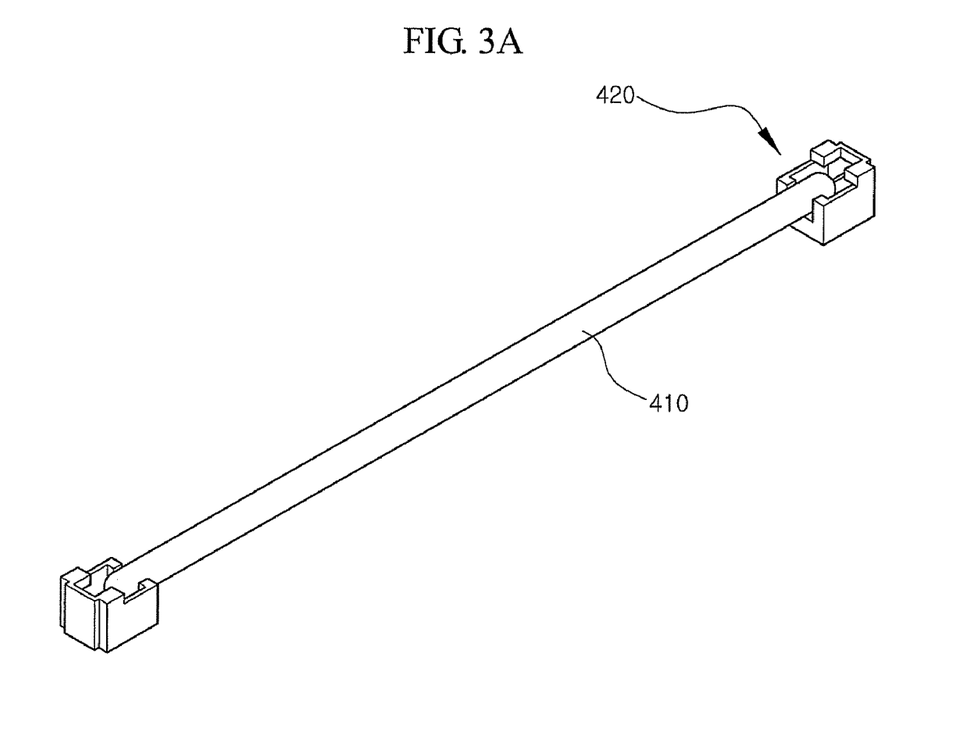
FIGS. 3A and 3B are schematic perspective and cross-sectional views of a lamp and a lamp socket according to the present invention.
Figure 3B:
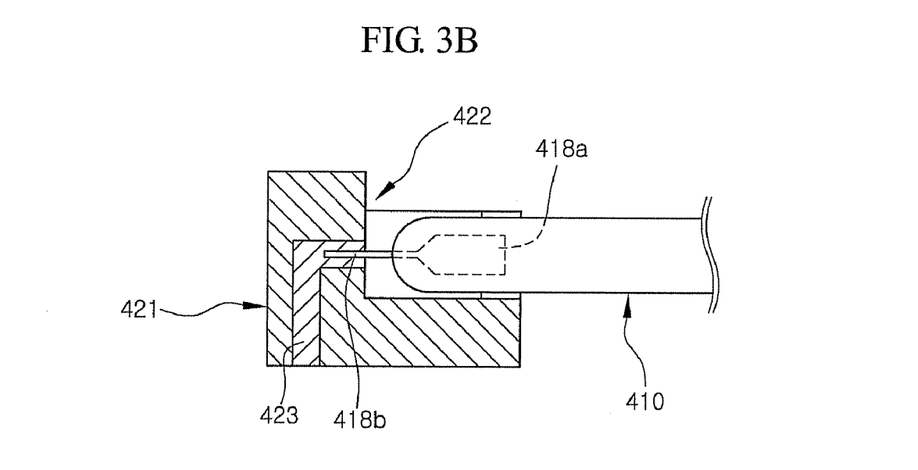

FIG. 2 is a schematic cross-sectional view of a lamp according to the present invention, and FIGS. 3A and 3B are schematic perspective and cross-sectional views of a lamp and a lamp socket according to the present invention.

Referring to FIG. 2, a lamp 410 includes a lamp tube 415 and an electrode portion 418. The lamp tube 415 includes a tube body 411, a fluorescent material layer 412 and discharge gas 413. The electrode portions 418, each including a lamp electrode 418a and a power supplying member 418b, such as a lead wire, are provided at both ends of the lamp tube 415, respectively.

When electric power is applied to the lamp 410 including the lead wire 418b as in the illustrated exemplary embodiment, the electric power is supplied to the lamp electrode 418a connected to the lead wire 418b. The discharge gas 413 residing in the tube body 411 is converted into plasma to emit invisible light which in turn excites the fluorescent material layer 412 to emit visible light to the outside of the lamp 410.

Referring to FIGS. 3A and 3B, a pair of lamp sockets 420 are disposed on a mold frame (not shown) and spaced apart from each other at a certain interval. The lamp 410 is coupled and secured between the pair of lamp sockets 420.

The lamp socket 420 includes a body 421 and a conductive fixing portion 423. A receiving portion 422 serving as a space in which the lamp 410 is securely placed is formed in the body 421. The conductive fixing portion 423 is electrically connected to the lead wire 418b of the lamp 410 and formed at an inner portion (or side) of the body 421.

One end of the conductive fixing portion 423 is shaped to correspond (e.g. in shape, dimension and/or location) to the lead wire 418b. The other end of the conductive fixing portion 423 extends to a rear surface of the lamp socket 420. The conductive fixing member 423 may include a surface or portion exposed to an outside of the lamp socket 420 such that the lamp 410 is supplied with power. As in the illustrated exemplary embodiment, the conductive fixing portion 423 forms an "L" shape. Of course, the shape of the conductive fixing portion 423 and lamp socket is not limited thereto but can be changed in various shapes to enable the lamp 410 to be coupled and fixed to the lamp socket 420 and to be supplied with electric power. The conductive fixing portion 423 serves to supply the lead wire 418b with electrical power and also serves to fix the entire lamp 410 by securing the lead wire 418b. In one exemplary embodiment, the lamp socket 420 may be integrally formed with the mold frame. In an alternative exemplary embodiment, the lamp socket may be separately manufactured and then coupled with the mold frame.

As in the illustrated exemplary embodiment, if the lamp 410 is mounted to the lamp sockets 420, it is not necessary to provide the lamp wire and the lamp connector as used in the prior art. Advantageously, a driving failure of the backlight assembly caused by the breaking of the lamp wire can be reduced or effectively prevented in the process of assembling the backlight assembly. Furthermore, since a process of connecting the lamp and the lamp wire may be omitted, there is an advantage in that the time taken to assemble the backlight assembly can be reduced.

Figure 4:
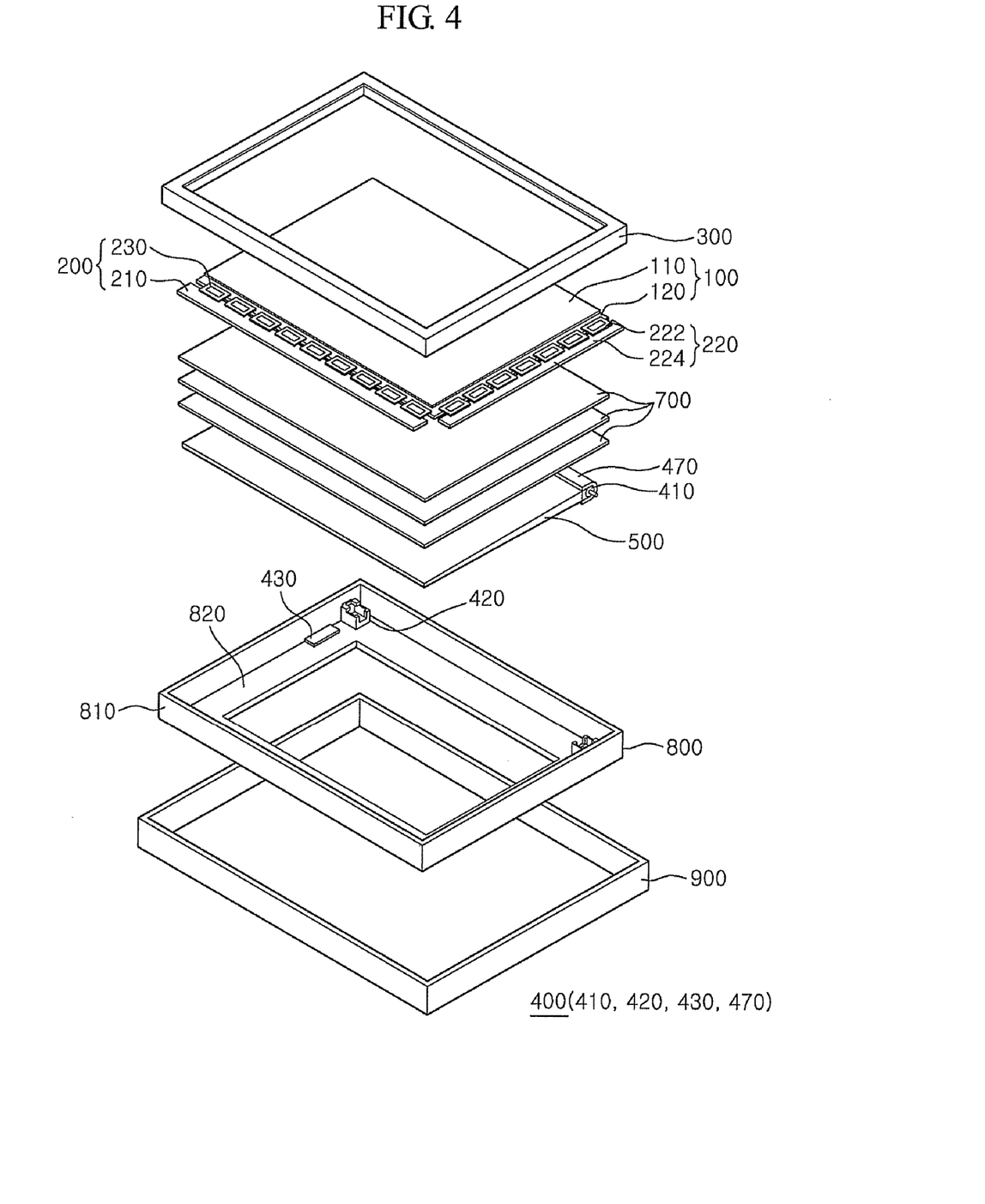
FIG. 4 is an exploded perspective view of an exemplary embodiment of a liquid crystal display including a backlight assembly according to the present invention.

FIG. 4 is an exploded perspective view of an exemplary embodiment of a liquid crystal display including a backlight assembly according to the present invention.

Referring to FIG. 4, the liquid crystal display ("LCD") includes an upper receiving container 300, an LCD panel 100, driving circuit units 200 and 220, a plurality of optical sheets 700, a lamp unit 400, a light guide plate 500, a mold frame 800 and a lower receiving container 900.

The LCD panel 100 includes a color filter substrate 110 and a thin film transistor ("TFT") substrate 120. The color filter substrate 110 may be a substrate formed through a thin film forming process with an RGB (Red, Green, Blue) color filter that serves as a color pixel from which a predetermined color is produced while light passes through the pixel. A common electrode made of a transparent conductor such as indium tin oxide ("ITO") or indium zinc oxide ("IZO") may be coated on a front surface of the color filter substrate.

The TFT substrate 120 may be a transparent glass substrate on which TFTs are formed substantially in a matrix pattern. Data lines are connected to source terminals of the TFTs, gate lines are connected to gate terminals thereof, and pixel electrodes each including a transparent electrode made of a transparent conductive material are connected to drain terminals thereof. When electric signals are input to the data and gate lines, the respective TFTs are turned on or off such that the electrical signals required in the formation of pixels can be applied to the drain terminals. If electric power is applied to the gate and source terminals of the TFT substrate to turn on a TFT, an electric field is created between the pixel electrodes and the common electrodes of the color filter substrate. As a result, the liquid crystal injected between the TFT substrate and the color filter substrate changes its arrangement, and thus, the light transmittance is also changed in accordance with the changed alignment, so that desired images can be obtained.

The driving circuit units 200 and 220 are connected to the LCD panel 100. The driving circuit units 200 and 220 include a gate-side printed circuit board ("PCB") 224 equipped with a control integrated circuit ("IC") to apply a predetermined gate signal to the gate line of the TFT substrate 120, a data-side PCB 210 equipped with a control IC to apply a predetermined data signal to the data line of the TFT substrate 120, a gate-side flexible PCB 222 for connecting the TFT substrate 120 and the gate-side PCB 224, and a data-side flexible PCB 230 for connecting the TFT substrate 120 and the data-side PCB 210. The gate-side and data-side PCBs 210 and 244 are connected to the gate-side and data-side flexible PCBs 222 and 230, respectively, to apply a gate driving signal and an external image signal. In an exemplary embodiment, the gate-side and data-side PCBs 224 and 210 may be integrated into a single PCB. In addition, since each of the gate-side and data-side flexible PCBs 222 and 230 is mounted with a driving IC (not shown), digital power, RGB (Red, Green, Blue) signals or the like generated from the gate-side and data-side PCBs 224 and 210 can be transmitted to the LCD panel 100. In the illustrated exemplary embodiment, a tape-automated bonding ("TAB") mounting method is described. Alternative exemplary embodiments may apply a chip on glass ("COG") mounting method in which a driving IC is not mounted to the flexible PCBs 222 and 230, but to the TFT substrate 120.

The upper receiving container 300 is formed into a substantially rectangular frame having a planar portion and sidewall portions. The sidewall portions are bent perpendicular to each other, to prevent the LCD panel 100 and the driving circuit units 220 and 200 from being separated from the receiving container and to protect the LCD panel and the driving circuit units from external shock.

The lamp unit 400 includes the lamp 410, the lamp sockets 420, an inverter 430, a conductor (not shown) and a lamp reflector 470. In one exemplary embodiment, a cold cathode-ray tube type lamp may be used as the lamp 410, but the present invention is not limited thereto. That is, a variety of lamps can be employed in the present invention. As in the illustrated exemplary embodiment, the lamp reflector 470 is disposed on one side of the lamp 410 to reflect light emitted radially from the lamp 410 in one direction, e.g. toward an incident surface of the light guide plate 500, so that an efficiency of light can be maximized.

The lamp sockets 420 are disposed on the mold frame 800 at a certain interval, e.g. an interval corresponding to a length of the lamp 410. The lamp 410 is coupled and fixed between the pair of lamp sockets 420 disposed on the mold frame 800.

The inverter 430 supplies the lamp 410 with electric power and is disposed on the mold frame 800. The lamp sockets 420 and the inverter 430 are electrically connected to each other through a conductor (not shown) formed on the mold frame 800.

As in the exemplary embodiment, only one lamp is used, but the present invention is not limited thereto. In alternative exemplary embodiments, two or more lamps may be employed in the present invention. If the two or more lamps are used, a plurality of the lamp sockets corresponding in number to the lamps are installed on the mold frame.

The light guide plate 500 is coupled with the lamp reflector 470 to convert a line light source such as lamp unit 400 into a surface light source. In exemplary embodiments, a wedge-type plate (see FIG. 4) or parallel flat plate can be used as the light guide plate 500. In one exemplary embodiment, a reflection plate (not shown) may be disposed below the light guide plate 500. A plate with high light reflectivity may be used as the reflection plate and installed such that it is brought into contact with an upper surface of a bottom of the lower receiving container 900.

The optical sheet 700 is disposed on the light guide plate 500 to allow luminance distribution of the light emitted from the light guide plate 500 to be uniform.

The mold frame 800 is shaped substantially as a rectangular frame with a receiving space formed therein. The light guide plate 500, the lamp unit 400 and a plurality of optical sheets 700 are accommodated in the receiving space.

The mold frame 800 is composed of a plurality of sidewalls 810 and a seating portion 820. The plurality of sidewalls 810 are formed into a substantially rectangular frame and the seating portion 820 protrudes inward from the sidewalls 810 and supports the light guide plate 500, a plurality of optical sheets 700 and the like received in the mold frame 800. The lamp sockets 420, the inverter 430 and the like may be disposed in a receiving space defined in the rectangular frame. As in the illustrated exemplary embodiment, the seating portion 820 protruding from the sidewalls 810 is separate from and coupled to the sidewalls 810. In an alternative exemplary embodiment, the seating portion 820 can be formed integrally with the sidewalls 810. A step portion may be formed on an inner side of each sidewall and thus can serve as the seating portion.

As in the illustrated exemplary embodiment, the lamp sockets 420 are formed integrally with the seating portion 820 of the mold frame, the present invention is not limited thereto. In exemplary embodiments, a hook (not shown) for securing the lamp socket 420 to the mold frame 800 may be formed on an outer surface of the body 421 of the lamp socket 420. A groove (not shown) that can be coupled with the hook may be formed on the mold frame 800, so that the lamp socket 420 can be coupled with the mold frame 800 through a coupling structure including the hook and groove. In an alternative exemplary embodiment, the lamp socket 420 and the mold frame 800 may be coupled with each other through another coupling structure different from the hook-and-groove coupling structure.

The lower receiving container 900 is coupled with the mold frame 800 to receive the aforementioned components of the LCD therein.

The driving circuit units 220 and 200 and the inverter 430 of the lamp unit 400 are connected to a power supply unit (not shown) and a system cable (not shown) to receive electric power necessary to operate the LCD from the power supply section.

Figure 5:
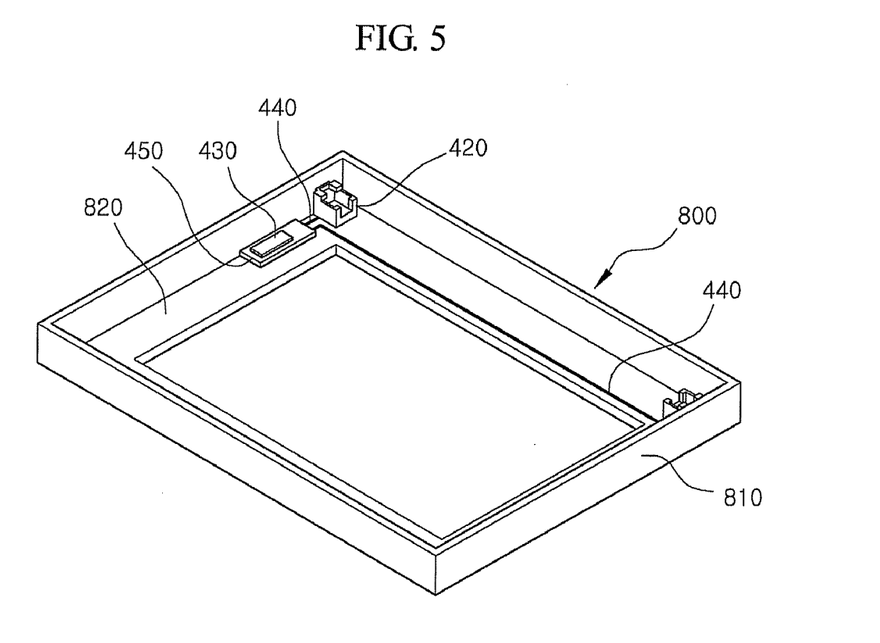
FIG. 5 is a partial perspective view of another exemplary embodiment of a backlight assembly according to the present invention.
Figure 6:
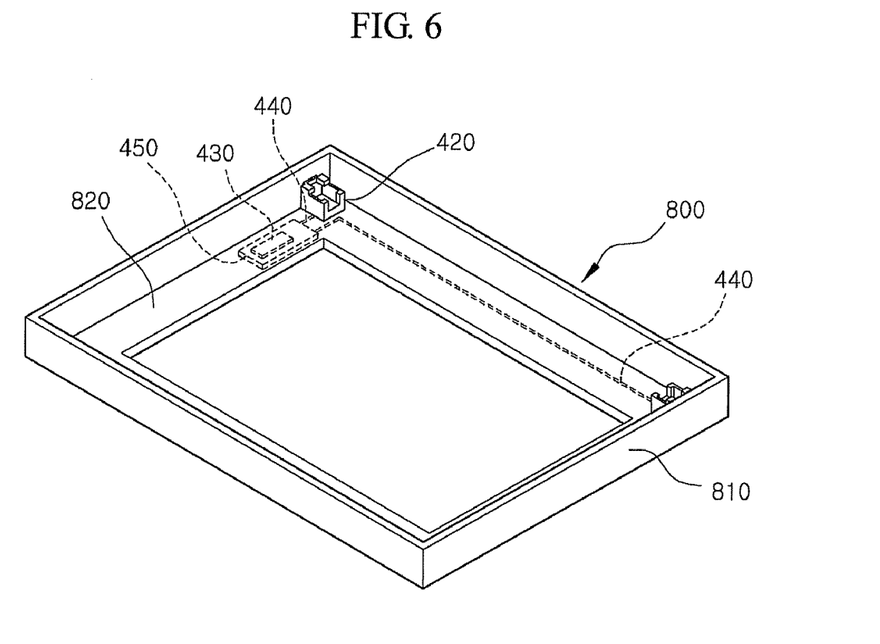
FIG. 6 is a partial perspective view of another exemplary embodiment of a backlight assembly according to the present invention.

FIG. 5 is a partial perspective view of another exemplary embodiment of a backlight assembly according to the present invention and FIG. 6 is a partial perspective view of another exemplary embodiment of a backlight assembly according to the present invention.

The exemplary embodiments shown respectively in FIG. 5 and FIG. 6 are different from the embodiment in FIG. 4 in that the inverter 430 of the lamp unit 400 is mounted onto an inverter printed circuit board 450 and the inverter printed circuit board 450 is then disposed on the mold frame 800. Hereinafter, features in FIGS. 5 and 6 different from that of FIG. 4 will be described.

The mold frame 800 and only some parts of the lamp unit 400 disposed on the mold frame 800 among the backlight assembly are illustrated in FIGS. 5 and 6. The other parts of the backlight assembly are omitted from these figures for convenience of illustration. Referring to FIG. 5, the lamp sockets 420 are disposed on the mold frame 800 at a certain interval, e.g. an interval corresponding to a length of the lamp 410, and the lamp 410 is coupled and secured between a pair of lamp sockets 420 disposed on the mold frame 800.

The inverter 430 supplies the lamp 410 with electric power. The inverter 430 is mounted on the inverter printed circuit board 450 which in turn is disposed on the mold frame 800. The lamp socket 420 and the inverter printed circuit 450 are electrically connected to each other through the conductor 440 formed on the mold frame 800. In an exemplary embodiment, the inverter PCB 450 and/or the conductor 440 may be disposed on the mold frame 800 such that an upper surface of the inverter PCB 450 and the conductor 440 are substantially level with or protrude from a corresponding surface of the mold frame (e.g. the seating portion 820) by a minimal distance so that the light guide plate 500 is accommodated efficiently in the mold frame 800.

The mold frame 800 includes a plurality of sidewalls 810 and a seating portion 820. The lamp sockets 420 are disposed on one surface, i.e. an upper surface, of the seating portion 820 of the mold frame. The inverter printed circuit board 450 and the conductor 440 are also disposed on a top surface of the seating portion 820 of the mold frame. Referring to FIG. 6, the inverter printed circuit board 450 and the conductor 440 are disposed on the other surface, i.e. a bottom or rear surface, of the seating portion 820 of the mold frame 800.

As in the illustrated exemplary embodiments of FIGS. 5 and 6 that the inverter printed circuit board 450 is disposed on the seating portion 820 of the mold frame, the present invention is not limited thereto. In an alternative exemplary embodiment, the inverter printed circuit board may be disposed on a variety of locations of the mold frame. In one exemplary embodiment, the inverter printed circuit board 450 can be arranged on an inner surface of the sidewall 810 of the mold frame.

Figure 7A:
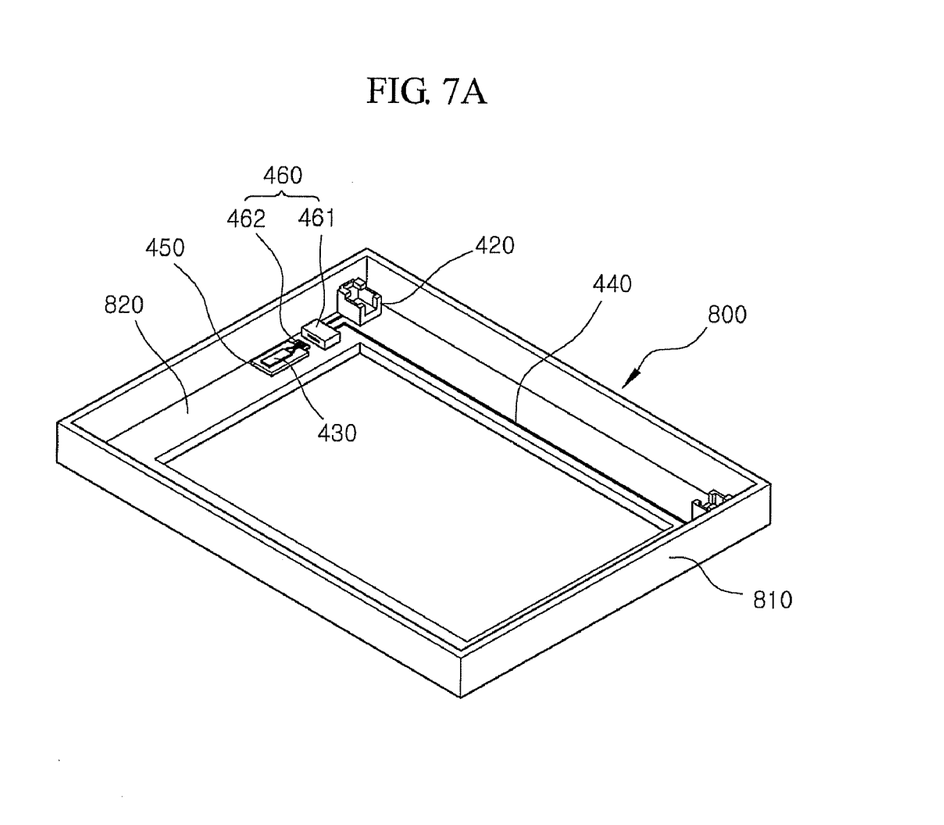
FIGS. 7A and 7B are partial perspective and enlarged views of another exemplary embodiment of a backlight assembly according to the present invention.
Figure 7B:
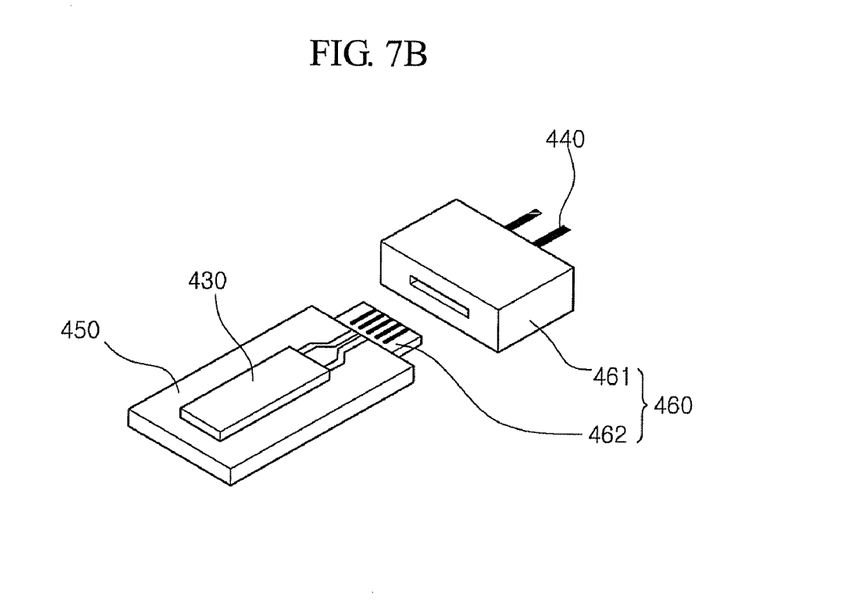

FIGS. 7A and 7B are partial perspective and enlarged views of another exemplary embodiment of a backlight assembly according to the present invention.

The exemplary embodiment shown in FIGS. 7A and 7B is different from those embodiments illustrated in FIGS. 4-6 in that the inverter printed circuit board 450 of the lamp unit 400 is electrically and structurally connected to the conductor 440 through a connector. Hereinafter, features of FIGS. 7A and 7B different from those of FIGS. 4-6 will be described.

Referring to FIGS. 7A and 7B, the lamp sockets 420 are disposed on the mold frame 800 at a certain interval, e.g. an interval corresponding to a length of the lamp 410 and the lamp 410 is coupled and secured between a pair of lamp sockets 420 disposed on the mold frame 800. The inverter 430 for supplying electric power to the lamp 410 is mounted on the inverter printed circuit board 450 which in turn is disposed on the mold frame 800. The lamp sockets 420 and the inverter printed circuit board 450 are electrically connected to each other through the conductor 440 formed on the mold frame 800. The lamp sockets 420, the inverter printed circuit board 450 and/or the conductor 440 may be disposed on a top surface of the seating portion 820 of the mold frame 800. In an alternative exemplary embodiment, the lamp sockets 420, the inverter printed circuit board 450 and/or the conductor 440 may be disposed on a bottom or rear surface of the seating portion 820 of the mold frame 800. The lamp sockets 420, the inverter printed circuit board 450 and/or the conductor 440 may be disposed on an inner side (e.g. toward the receiving space) of the sidewall 810 of the mold frame 800.

A first connector 461 is formed at one end of the conductor 440 and a second connector 462 electrically and mechanically connected to the first connector 461 is formed at one end of the inverter printed circuit board 450. As in the illustrated exemplary embodiment, the first connector 461 is formed with a box-shape body and a coupling groove formed in one side of the body (e.g. corresponding to the side proximate to the inverter circuit PCB) at a certain depth. The second connector 462 formed at one end of the inverter printed circuit board 450 is coupled into the coupling groove of the first connector 461 such that the two connectors are electrically and mechanically connected with each other. As a result, the conductor 440 and the inverter printed circuit board 450 are connected to each other through a connector unit 460 including the first and second connectors 461 and 462.

As in the illustrated exemplary embodiments, a structure for coupling the lamp and the inverter can be implemented within the lamp socket. Advantageously, there exists a possibility that a variety of different backlight assemblies should not be required or produced due to the change of only the lamp connector.

The illustrated exemplary embodiments have advantages in that the development expense for the backlight assembly is reduced, the production efficiency is improved and the production control becomes relatively simple.

The backlight assembly and the liquid crystal display having the same according to exemplary embodiments according to the present invention as described above are merely illustrative embodiments. Although the edge type backlight assembly is described as being used in the present invention, the present invention is not limited thereto. That is, the present invention can be applied to a direct type backlight assembly.

Although the present invention has been described in detail in connection with the preferred embodiment, it will be readily understood by those skilled in the art that various modifications and changes can be made thereto within the technical spirit and scope of the present invention. It is also apparent that the modifications and changes fall within the scope of the present invention defined by the appended claims.

What is claimed is:

1. A backlight assembly, comprising:
   a mold frame including a receiving space therein, a plurality of sidewalls, and a seating portion protruding inward from the sidewalls; and
   a lamp unit disposed in the receiving space of the mold frame,
   wherein the lamp unit comprises at least one lamp, each of a pair of lamp sockets disposed directly on and contacting the mold frame, an inverter supplying electric power to the lamp and a conductor electrically connecting the lamp socket and the inverter,
   wherein the lamp sockets secure the lamp and apply electric power to the lamp, and the inverter is disposed on a surface of the seating portion of the mold frame.

2. The backlight assembly as claimed in claim 1, wherein the each of the pair of lamp sockets is disposed at opposing ends of the lamp, respectively.

3. The backlight assembly as claimed in claim 1, wherein the lamp unit further comprises an inverter printed circuit board, the inverter being mounted on the inverter printed circuit board.

4. The backlight assembly as claimed in claim 3, wherein the lamp unit further comprises:
   a first connector disposed at one end of the conductor opposite to the lamp sockets relative to the conductor, and connected to both of the pair of lamp sockets; and
   a second connector formed at one end of the inverter printed circuit board and connected electrically and mechanically directly to the first connector.

5. The backlight assembly as claimed in claim 1, wherein the pair of lamp sockets are disposed on the sidewall of the mold frame or on the surface of the seating portion.

6. The backlight assembly as claimed in claim 3, wherein the inverter printed circuit board is disposed on the surface of the seating portion of the mold frame.

7. The backlight assembly as claimed in claim 1, wherein the conductor is disposed on the surface of the seating portion of the mold frame.

8. The backlight assembly as claimed in claim 1, wherein the lamp comprises:
   a lamp tube including predetermined discharge gas and fluorescent material layer; and
   electrode portions installed at both ends of the lamp tube and supplying electric power to the lamp.

9. The backlight assembly as claimed in claim 8, wherein the each of the pair of lamp sockets comprises:
   a body including a receiving portion receiving the lamp; and
   a conductive fixing portion within the receiving portion, connected electrically to the electrode portion of the lamp and extending to a rear of the lamp socket facing the mold frame.

10. The backlight assembly as claimed in claim 9, wherein the lamp unit further comprises a lamp reflector disposed at one side of the lamp and reflect light emitted from the lamp.

11. The backlight assembly as claimed in claim 10, further comprising:
   a light guide plate disposed at one side of the lamp unit; and
   a plurality of optical sheets disposed on the light guide plate.

12. The backlight assembly as claimed in claim 11, further comprising a lower receiving container coupled with the mold frame.

13. A liquid crystal display, comprising:
   a mold frame including a receiving space therein, a plurality of sidewalls, and a seating portion protruding inward from the sidewalls;
   a lamp unit including at least one lamp, each of a pair of lamp sockets disposed directly on and contacting the mold frame, an inverter supplying electric power to the lamp and a conductor electrically connecting the lamp socket and the inverter; and
   a liquid crystal display panel displaying images thereon,
   wherein the lamp sockets secure the lamp and apply electric power to the lamp, and the inverter is disposed on a surface of the seating portion of the mold frame.

14. The liquid crystal display as claimed in claim 13, wherein the each of the pair of lamp sockets is disposed at opposing ends of the lamp, respectively.

15. The liquid crystal display as claimed in claim 13, wherein the lamp unit further comprises an inverter printed circuit board, the inverter being mounted on the inverter printed circuit board.

16. The liquid crystal display as claimed in claim 15, wherein the inverter printed circuit board is disposed on the mold frame.

17. The liquid crystal display as claimed in claim 16, wherein the lamp unit further comprises:
   a first connector formed at one end of the conductor; and
   a second connector formed at one end of the inverter printed circuit board and connected electric ally and mechanically to the first connector.

18. The liquid crystal display as claimed in claim 17, further comprising:
   a lower receiving container disposed at a lower side of the mold frame and coupled with the mold frame; and
   an upper receiving container disposed at an upper side of the liquid crystal display panel.

19. A method of manufacturing a backlight assembly, the method comprising:
   forming a mold frame including a receiving space, a plurality of sidewalls, and a seating portion protruding inward from the sidewalls; and
   disposing a lamp unit in the receiving space;
   wherein the lamp unit includes a lamp, a pair of lamp sockets securing the lamp and applying power to the lamp, an inverter supplying electric power to the lamp and a conductor electrically connecting the lamp socket and the inverter, the inverter being disposed on a surface of the seating portion of the mold frame; and
   wherein the disposing a lamp unit includes disposing the lamp sockets directly on and contacting the mold frame.

20. The method of claim 19, further comprising mounting the inverter on an inverter printed circuit board and disposing the inverter printed circuit board on the mold frame.

21. The method of claim 20, further comprising:
   forming a first connector at the end of the conductor; and
   forming a second connector at a first end of the inverter printed circuit board; and
   electrically and mechanically connecting the second connector to the first connector.

* * * * *